United States Patent [19]

Miller

[11] Patent Number: 4,866,354
[45] Date of Patent: Sep. 12, 1989

[54] SPIRAL FREEZER DRIVE SYSTEM
[75] Inventor: David B. Miller, Bandera, Tex.
[73] Assignee: Refrigeration Engineering Corporation, San Antonio, Tex.
[21] Appl. No.: 185,542
[22] Filed: Apr. 25, 1988
[51] Int. Cl.$^4$ .................. H02P 5/46; B65G 21/18; F25D 25/04
[52] U.S. Cl. ........................ 318/67; 318/77; 62/381; 198/778; 198/952
[58] Field of Search .................. 318/6, 7, 52, 53, 67, 318/68, 69, 70, 77; 62/63, 266, 380, 381; 198/855, 952, 544, 660, 662, 676, 778

[56] References Cited

U.S. PATENT DOCUMENTS

| | | | |
|---|---|---|---|
| 3,280,393 | 10/1966 | Crossley | 318/6 |
| 3,809,335 | 5/1974 | Mantey | 318/6 X |
| 4,023,376 | 5/1977 | Onodera | 62/63 |
| 4,126,817 | 11/1978 | Luzio | 318/7 |
| 4,276,498 | 6/1981 | Stager et al. | 318/6 |
| 4,363,457 | 12/1982 | Flint et al. | 318/7 X |
| 4,401,923 | 8/1983 | O'Gwynn | 318/6 |
| 4,513,229 | 4/1985 | Kudelski | 318/7 |
| 4,798,062 | 1/1989 | Lipinski et al. | 62/381 |

Primary Examiner—Bentsu Ro
Attorney, Agent, or Firm—Watson, Cole Grindle & Watson

[57] ABSTRACT

In spiral drum freezer apparatus having an insulated disclosure a spiral drum is mounted for rotation within the enclosure and includes a spiral belt to the spiral drum with the top of the spiral drum being supported by UHMW bearings and the bottom of the spiral drum being supported by a planetary wheel drive. A gear motor is connected to the planetary wheel drive for rotating the spiral drum at a specified speed. A take-up drive gear motor drives the spiral belt. A tachometer feedback speed control sense the speed of the drum gear motor and controls the speed thereof and the take-up drive gear motor in accordance with the preselectable speed.

3 Claims, 4 Drawing Sheets

SPIRAL FREEZER DRIVE SYSTEM

BACKGROUND OF THE INVENTION

1. Field of the Invention

This invention relates to drive systems for controlling transport belts in production freezing systems, and more particularly to such drive systems in spiral freezer apparatus in which the conveying mechanism is commonly known as spiral.

2. Related Art

Lotension spiral drive systems rely on overdrive to operate properly, wherein the relationship between the speed of the belt at the inside edge and the surface of the drum is very important in the spiral operation.

The overdrive condition is usually accomplished by a mechanical linkage between the cage and the take-up. The linkage is limited in adjustment by gears and sprockets and the resulting ratios available. Such an arrangement is fixed until the ratios are physically changed. The mechanical linkage is usually cumbersome and difficult to implement. The take-up is, by association, too strong and can cause damage to the belt in a jam (clutch systems are unreliable to solve such a problem). The mechanical drive on the drum (chain oriented horizontally) and the mechanical linkage require relatively high maintenance for the chain, sprockets, tensioners, bearings and chain guides.

U.S. Pat. No. 3,280,393 discloses a tension override used in a tensioning motor control system that operates in addition to the normal tension controls associated with paper processing machines and which senses changes in the web tension. One of the supply roll or the calendar roll is adapted to move in response to changes in tension in the web. An electrical signal representing the change in web tension is input to a regulator controlling the field of the unwind generator to either increase or decrease the braking force applied to the unwind motor of the supply roll.

U.S. Pat. No. 4,126,817 is another tension control servo system for maintaining constant tension on a moving web used to transport and position original documents in an exposure station of a reproduction machine. A take-up reel motor and supply reel motor are energized by a signal from a common source, with the signal applied to the supply reel motor being a derivative of that applied to the take-up reel motor. The supply reel is thereby energized during periods of acceleration or deceleration of the web.

The web tensioning system of U.S. Pat. No. 4,363,457 also maintains constant tension of a web between a supply and take-up reel. The currents are sensed in each of the motors driving the supply reel and the take-up reel such that the sum of the motor currents is maintained at a substantially constant value, whereby the sum of the torques generated by the motors is held substantially constant with changing radii of the spools during web movement.

The web movement control of U.S. Pat. No. 3,809,335 uses a plurality of error signals, including a tension command pulse, which are individually weighted for each of the two reel motors such that the reel motor servocontrol mechanism controls the motors to obtain desired tape acceleration/deceleration, speed and tension parameters.

The reel servocontrol system of U.S. Pat. No. 4,513,229 uses a motor-driven capstan of low inertia to draw tape past a cylindrical scanning drum and a tension servo arm to provide a signal representative of tape tension in a loop adjacent the supply reel. A tension error signal controls the supply reel motor and a tension reference signal is modified in response to a signal which represents the energization of the capstan motor, and accordingly the torque output thereof to provide automatic compensation for variation in tape tension at the scanning drum.

SUMMARY OF THE INVENTION

The present invention overcomes the aforementioned disadvantages by the use of two separate AC motor gear drives controlled by AC inverters. The drum drive is a helical bevel gear motor coupled directly to a planetary wheel drive. Such a combination eliminates the chain drive and associated sprockets as well as the bottom drum bearing. Such a drive is controlled by an AC inverter that monitors motor speed by means of a tachometer feedback loop. The inverter maintains drum speed through a preset potentiometer regardless of load or tension in the system. The take-up drive is a helical bevel AC gear motor. The gear motor is adjusted by electronic means to keep the drive at low torque values so that the belt does not experience excessive tension. The ratio between the two drives is controlled using a feedback loop between the two AC inverters, the drum acting as the master control. The overdrive, once set, is linear throughout the entire 8:1 range of the belt. The overdrive is easily changed by means of a potentiometer adjustment.

The AC inverters also start at different ramp speeds so that the drum is running at full speed for as long as 20 seconds before the take-up reaches its set speed. This allows the belt to break free from the drum in the case of a freezing condition. These changes are all easily made by potentiometer adjustments. The gear drive ratios are designed to allow AC line voltage to be applied to the gear motors so the belt may be driven in the event of an inverter failure.

It is therefore a primary object of the present invention to provide an electronic control system for controlling the speed of the drum and take-up gear motors in a Lotension spiral drive system, and particularly of the type used in spiral freezer systems.

It is a further object of the present invention to replace certain of the mechanical linkage elements in a spiral drive system of the type specified herein by electrical components to improve the reliability, life and ease of operation of such systems.

Yet another object of the present invention is to provide such an electronic speed control system using the fundamental principles of tachometer feedback systems, whereby the overdrive ratio between the drum gear motor and take-up gear motor drives are controlled by a feedback loop between two AC inverters.

Still another object of the present invention is to provide convenient means for presetting drum speed in a spiral drum type freezing system.

BRIEF DESCRIPTION OF THE DRAWINGS

The above objects, features and advantages of the invention are believed readily apparent from a consideration of the following description of a preferred embodiment of the best mode of carrying out the invention when taken in conjunction with the accompanying drawings wherein.

DETAILED DESCRIPTION OF THE PREFERRED EMBODIMENT

Figure 1:
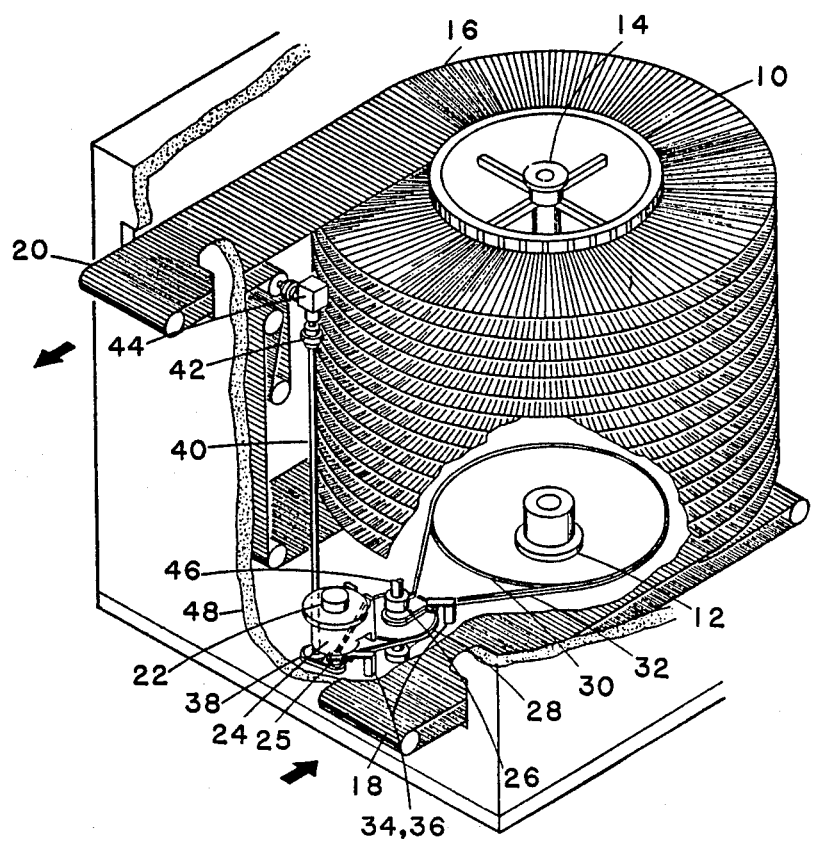
FIG. 1 illustrates a Lotension spiral drive system of the prior mechanical type.

FIG. 1 illustrates a typical Lotension mechanical spiral drive system in which spiral drum 10 is mounted by heavy duty double ball bearings 12, 14 within insulated enclosure 48. The heavy duty double ball bearing mounting is necessary because of the high radial load created by the chain drive mechanism as described more fully hereinafter. Heavy duty double ball bearings 12, 14 require lubrication to −60 degrees F., for example. Attached to spiral drum 10 is spiral belt 16 which is rotated counter clockwise by spiral drum 10 such that products to be frozen enter at product in-feed 18 and are transported in a spiral by the spiral belt 16 and frozen during transport to product exit 20.

The drive mechanism for spiral drum 10 includes motor drum take-up drive 22, gearbox 24, primary sprocket 25, heavy duty bearings 26, secondary sprocket 28, tertiary sprocket 30 and large pintle type drive chain 32 interconnected as shown in FIG. 1. Chain tensioners 34, 36 are provided for tensioning the pintle type drive chain.

A secondary timing drive 38 is provided for the take-up drive, and drive shaft 40 is interconnected therewith and to gear couplings 42 and to miter gearbox 44 for driving the spiral belt near product exit 20 as shown in FIG. 1. Intermediate drive shaft 46 supports secondary sprocket 28 through heavy duty bearings 26.

The operation of the afore-described components is known to those skilled in the spiral freezer art to which the invention pertains such that no further explanation of their structure and operation is believed necessary for the purposes of the invention.

The aforementioned components are mounted within an insulated enclosure 48 as shown in FIG. 1.

The drum drive final ratio is achieved by a series of sprocket reductions that are interconnected using a chain oriented on its side, which is an improper application, but which is accepted for lack of an acceptable alternative. Secondary and tertiary sprockets 28 and 30 require a shaft, such as intermediate support shaft 46, and two low temperature bearings for support, which again presents another maintenance problem. Chain tensioners 34, 36 create additional problems when they literally freeze up at the low temperatures within enclosure 48. Typical of such problems are the actual falling off of the chains from their respective sprockets causing the drive shaft to shear or damage the spiral belt 16 due to excessive tension because spiral drum 10 stops turning. Additional bearings must be placed within insulated enclosure 46 to support drive shaft 40 and take-up motor drum drive 22, for example. Drum take-up drive 22 and secondary timing take-up drive 38 must be located within the enclosure 46 because of mechanical limitations. The critical overdrive ratio required is often limited by the ratio created in a triple reduction of sprockets (i.e., there is no sprocket, for example, with 11½ teeth to correctly match the ratio needed).

Figure 2:
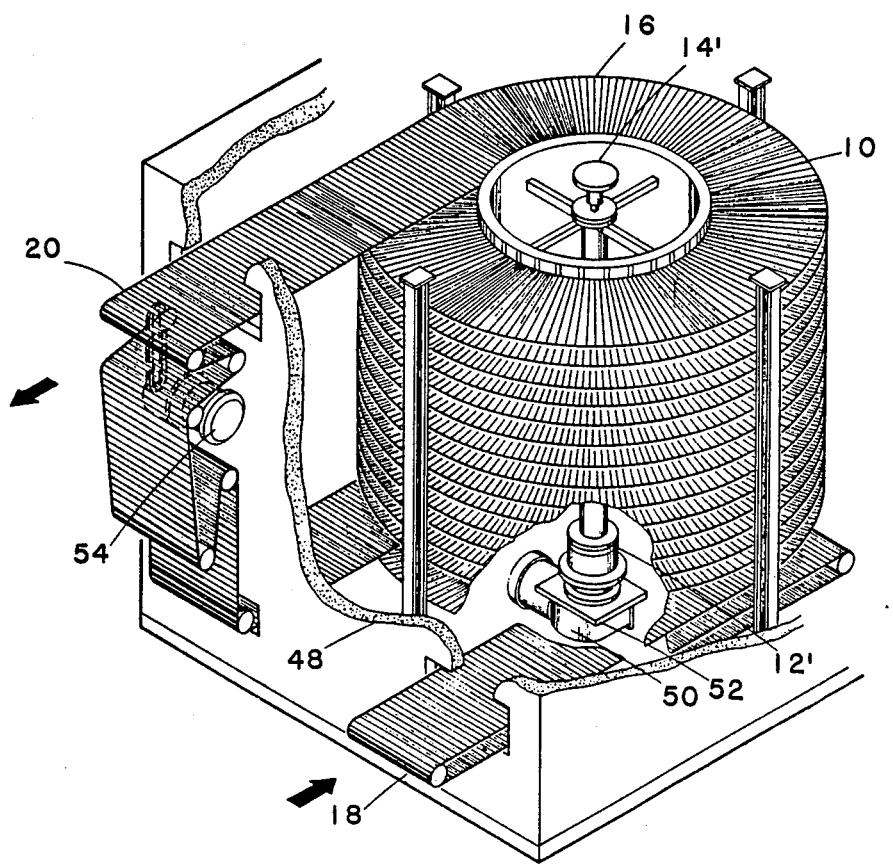
FIG. 2 shows an exemplary Lotension drive system as modified by the present invention.

All of the aforementioned disadvantages and problems are essentially eliminated in accordance with the electrical feedback drive system in accordance with the invention as illustrated in FIG. 2. The top and bottom heavy duty double ball bearings 12 and 14 required in the mechanical drive system of FIG. 1 have been replaced by an ultra-high molecular weight (UHMW) polyethylene bearing 14' on top and a wheel drive planetary gearbox 12' on the bottom as shown in FIG. 2. The wheel drive has a double tapered roller bearing design (planetary wheel drive 12') for very high radial loads, even though no such radial loads are anticipated because spiral drum 10 and gearbox 12' have the same radial center ine.

The UHMW bearing 14' requires no lubrication, thereby providing a significant advantage over the heavy duty ball bearings required in the known system of FIG. 1.

Gear motor 50 for the drum drive is coupled to planetary wheel drive 12' through torque plate 52 to transmit the driving force required to turn spiral drum 10. Both planetary wheel drive 12' and gear motor 50 are designed to run below −40 degrees F. with no adverse effects.

Helical bevel gear motor 54 for the take-up drive controls the drive of spiral belt 16 adjacent product exit 20 and eliminates the miter gearbox, gear couplings, drive shaft and secondary timing take-up drive as described above with respect to the mechanical drive system shown in FIG. 1. A significant advantage of the electrical feedback drive system as shown in FIG. 2 is that the gear motor 54 for the take-up drive is mounted outside insulated enclosure 48 and is not subjected to any of the problems encountered with the mechanical drive system described above. For example, take-up gear motor drive 54 can be mounted anywhere because the take-up is not limited to mechanical constraints as mentioned above.

Figure 3A:
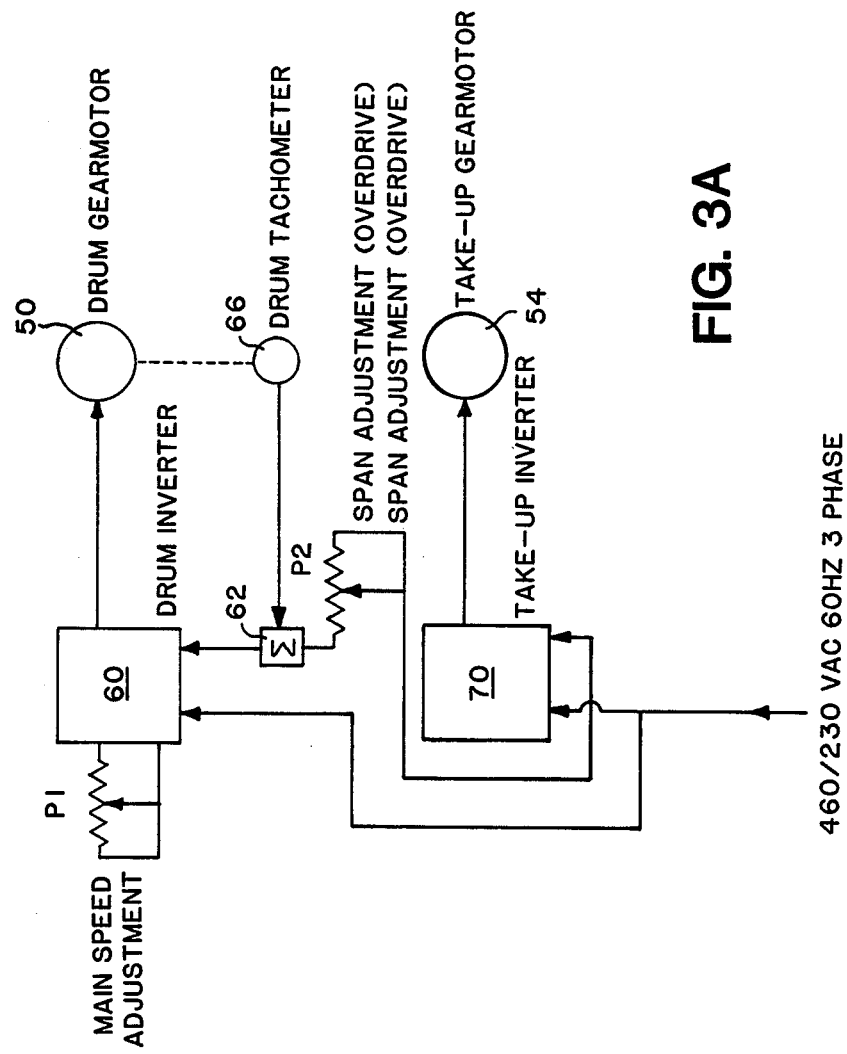
FIG. 3A a block schematic representation of the tachometer feedback control system in accordance with the present invention for controlling the speed of the gear motors illustrated in FIG. 2.

The tachometer feedback speed control system of FIG. 3A is used to control the speed of the gear motors shown in FIG. 2. The main speed of the drum gear motor is set and adjusted by potentiometer P1 which provides a control input to drum inverter 60, and which also receives AC supply voltage and an output of summation circuit 62. The output control voltage of drum inverter 60 is input to drum gear motor 50 to control the operating speed thereof. Drum tachometer 66 senses the speed of gear motor 50 and provides a signal indicative thereof to summation circuit 62 along with a voltage as set by potentiometer P2, which provides a span adjustment controlling the overdrive between the drum gear motor 50 and take-up gear motor 54. The voltage setting of potentiometer P2 is also input to take-up inverter 70 along with an AC power supply to provide a signal output for controlling the speed of take-up gear motor 54.

Drum inverter 60 maintains the drum speed set by potentiometer P1 regardless of the load or tension in the system. The ratio between the drum and take-up gear motors 50, 54 is controlled by the feedback loop including the span adjustment potentiometer P2, with the drum inverter 60 acting as the master controller.

Figures 1, 3B:
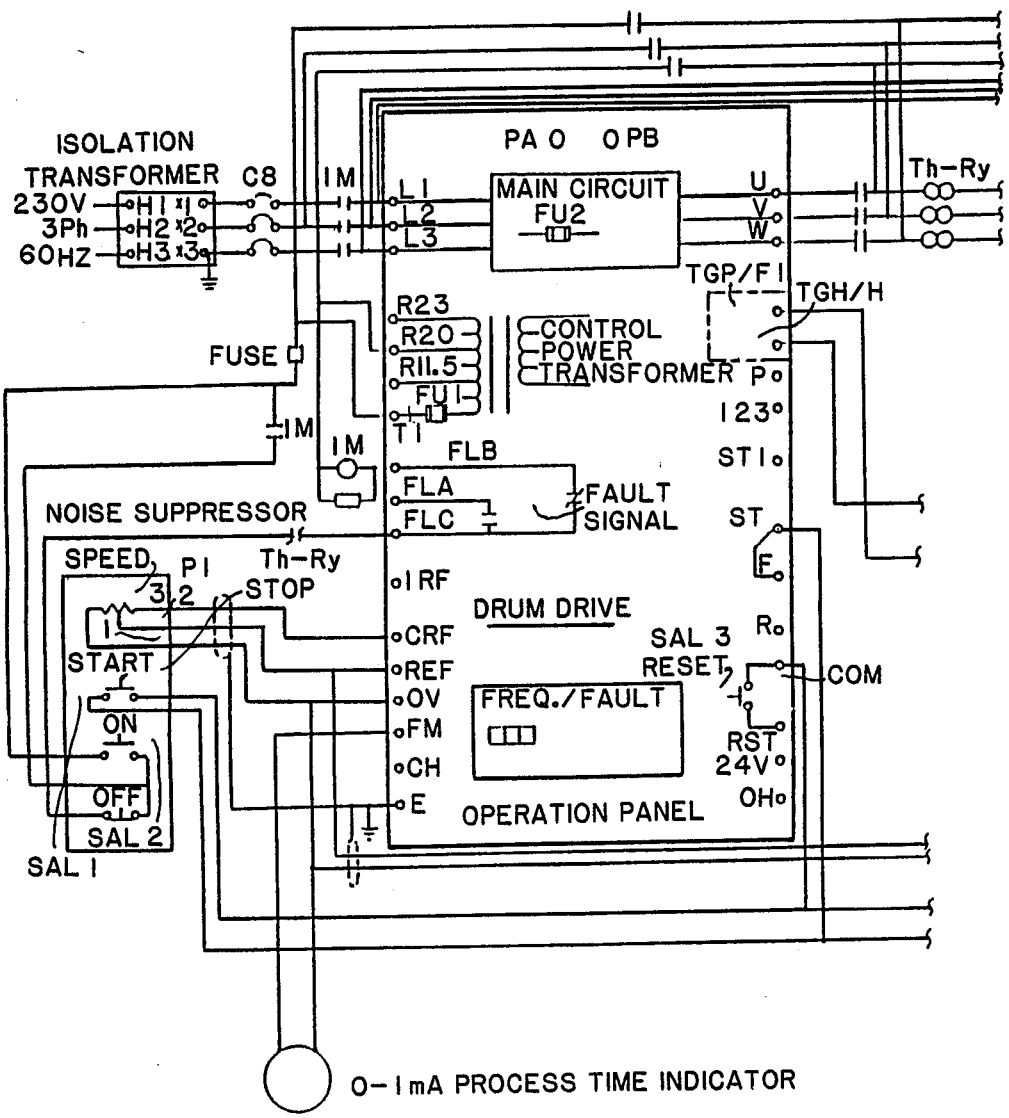
FIG. 3B shows a schematic of the controls for controlling the operation of the tachometer feedback control system of FIG. 3A.
Figures 2, 3B:
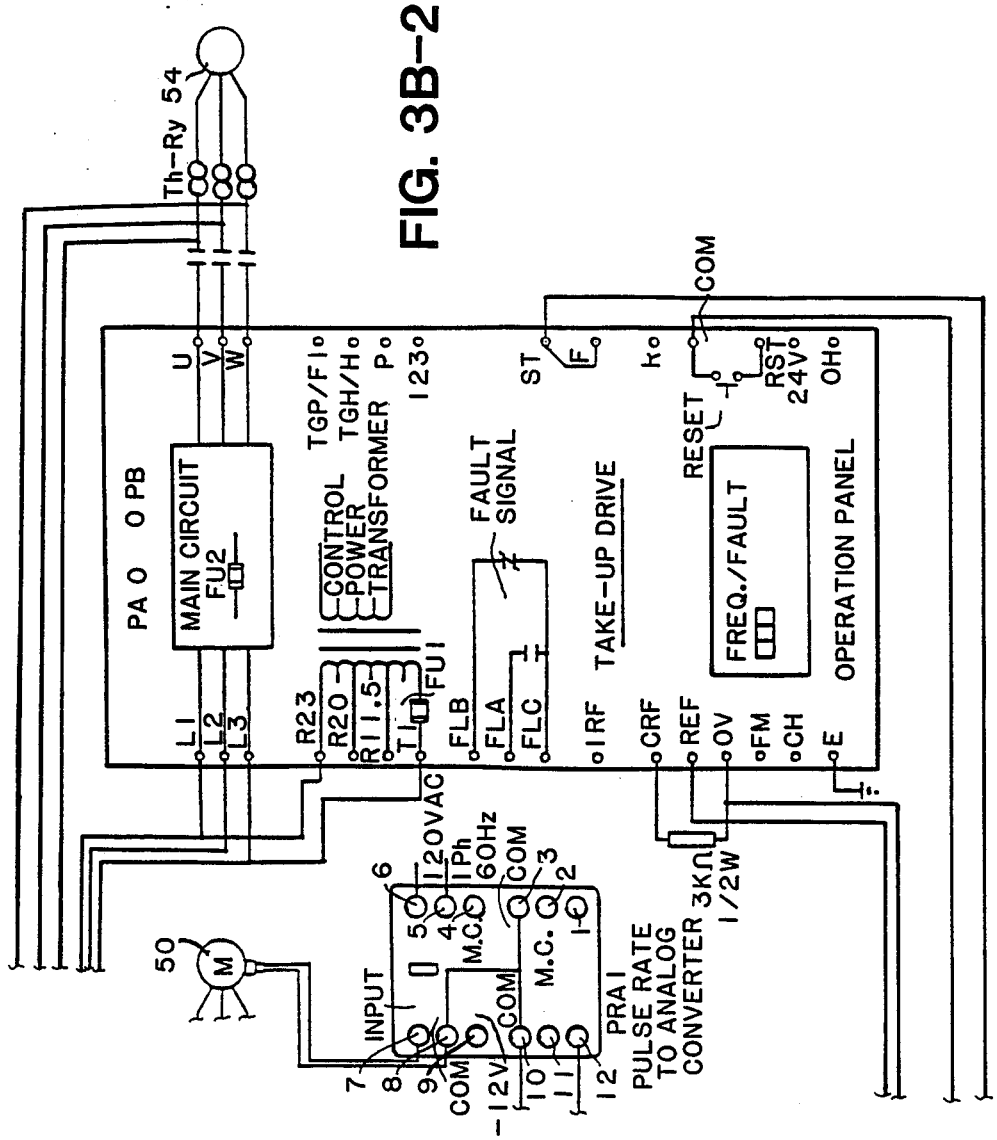

Provision is preferably made to initiate operation of the drum gear motor 50 prior to initiation of operation of the take-up gearmotor 54 so that the drum is running at full speed for as long as 20 seconds before the take-up gear motor 54 attains its full speed as described more fully with respect to the controller circuitry illustrated in FIG. 3B. This enables the belt to break free of the drum in case of a jam in the belt mechanism.

A constant speed of the drum drive is maintained regardless of load variations because of the aforedescribed tachometer feedback circuitry of FIG. 3A. However, a preset speed difference is set between the drum gear motor drive and the take-up gear motor drive of 20 Hz with the take-up drive being faster. Furthermore, although the amount of torque that the take-up drive can produce is limited, a speed variation between the two drives is dependent on the amount of belt tension present.

It may be desired that the drum drive runs up to speed before the take-up drive on initial start-up of the system. This ensures a clean break-away (from ice, etc.) before the belt actually begins motion. This can easily be achieved by varying the acceleration time of the two drives, although on initial set-up they are both matched.

The upper frequency limit on the drum drive is set at 60 Hz. Although there is capability to run at a higher speed, such as 80 Hz, the noise and clatter from the belt at such higher speeds may be objectionable.

The speed of both the gear motor and take-up gear motor drives is set by potentiometer P1 of FIG. 3A, which potentiometer is conveniently located on a control panel, the controls of which are described hereinafter with respect to FIG. 3B. The calibration/adjustment of the speed control system of the invention is initially performed with the two drives adjusted independently of each other. Then the speed regulation is added to the drum drive. Both drivers are disconnected from the drum inverter 60 and take-up inverter 70, respectively.

It is noted that the drum drive is speed regulated with the take-up drive following at a preset speed difference with minimum output torque setting. The changes in speed are very smooth throughout the entire speed range with no belt "skipping" and/or excessive tension build-up.

The take-up gear motor 54 and drive gear motor 50 are each normally powered through a variable frequency drive circuit 60. The take-up and drum drives are connected in a Master/Slave configuration with the drum drive being the master. Speed adjustments to the system are made by turning a front-mounted potentiometer P1 that is connected to the drum drive. A rotary pulse generator 66 attached to the drum motor 50 provides speed feedback data to the control unit via a pulse rate-to-analog converter 62. The pulse rate-to-analog converter also provides the slaving signal to the take-up gear motor drive 70. An output signal is taken from the drum drive as an input to a digital tachometer (not shown). Through a selector switch (not shown) on the front of the enclosure the tachometer displays either belt speed or product dwell time.

The foregoing description sets forth only an exemplary embodiment of the best mode of carrying out the invention and is therefore not to be used to limit the scope of the invention which is determined by the appended claims. Modifications of the invention will be readily apparent to those skilled in the motor control art and therefore scope of the invention is intended to be determined by the claims and the equivalents to which they are entitled.

What is claimed is:

1. Spiral drum freezer apparatus, comprising:
   an insulated enclosure;
   a spiral drum mounted for rotation within said enclosure and including a spiral belt attached thereto;
   UHMW bearing means for supporting the top of said spiral drum;
   a planetary wheel drive for supporting the bottom of said spiral drum;
   a drum gear motor connected to said planetary wheel drive for rotating said spiral drum at a specified speed;
   a take-up drive gear motor for driving said spiral belt; and
   tachometer feedback speed control means for sensing the speed of said drum gear motor and controlling the speed thereof and said take-up drive gear motor in accordance with a preselectable speed.

2. Spiral drum freezer apparatus according to claim 1, wherein said tachometer feedback speed control means controls the speed of said drum gear motor and said take-up drive gear motor with a selected overdrive of said spiral drum with respect to said spiral belt.

3. Spiral drum freezer apparatus according to claim 2, wherein said tachometer feedback speed control means includes a drum inverter for driving said drum gear motor, a take-up inverter for driving said take-up drive gear motor, a drum tachometer for sensing the speed of said drum gear motor, means for specifying the speed of said drum gear motor means for specifying the overdrive of said take-up drive gear motor with respect to said drum gear motor, and summation means responsive to an output from said drum tachometer and said means for specifying the overdrive to control the speed of said drum inverter.

* * * * *